United States Patent [19]
Eguchi et al.

[11] Patent Number: 5,227,825
[45] Date of Patent: Jul. 13, 1993

[54] LENS BARREL FOR CAMERA

[75] Inventors: Haruki Eguchi; Hiroaki Suzuki, both of Tokyo, Japan

[73] Assignee: Asahi Kogaku Kogyo Kabushiki Kaisha, Tokyo, Japan

[21] Appl. No.: 885,368

[22] Filed: May 19, 1992

[30] Foreign Application Priority Data

May 20, 1991 [JP] Japan ............................ 3-045103[U]

[51] Int. Cl.$^5$ ............................................ G03B 11/04
[52] U.S. Cl. .................... 354/287; 359/507; 359/600
[58] Field of Search ............... 354/287; 359/507, 508, 359/510, 511, 600

[56] References Cited

U.S. PATENT DOCUMENTS 3,715,149  2/1973  Freeland ............................ 359/511
5,126,881  6/1992  Crema ................................ 354/287

FOREIGN PATENT DOCUMENTS 7900867  11/1979  PCT Int'l Appl. .

*Primary Examiner*—Monroe H. Hayes
*Attorney, Agent, or Firm*—Sandler, Greenblum & Bernstein

[57] ABSTRACT

A lens barrel for a camera in which a lens hood is divided into a front annular hood member and a rear annular hood member. The lens hood is provided on an outer surface of a front portion of a lens frame in which a lens is housed. A rear portion of the front annular hood member is fitted in a front portion or the rear annular member. The rear portion and the front portion of the lens hood are connected to each other by screws. Portions connecting the front and rear annular hood members are covered with a cover member.

8 Claims, 2 Drawing Sheets

LENS BARREL FOR CAMERA

BACKGROUND OF THE INVENTION

1. Field of the Invention

The present invention relates to a lens barrel for a camera, and more particulary to a lens hood provided at a lens frame located at the front end of the lens barrel and movable along the optical axis of the lens barrel.

2. Description of the Related Art

Conventionally, a lens barrel having a lens hood movably supported by the lens barrel, is known. This lens hood is retracted to the camera body when not in use, and is slidably moved to be positioned at a front end of the lens barrel when used for preventing unnecessary light from entering the lens. Further, in another known lens barrel, the lens hood has an internal thread and a lens frame of the lens barrel has an external thread, and these internal threads and the external threads can be threadingly fitted to each other whereby the lens hood can be fixed at a desired projection position when in use. These lens hoods, however, cannot be fixed at the retracted position thereof when lens hood is not in use.

In yet another conventional lens barrel, the lens hood is divided into a front annular hood member and a rear annular hood member, each of which has an internal thread at a retracted position or a projected position thereof, respectively, whereby the lens hood can be fixed at the retracted position and at the projected position thereof. In this divided type of lens hood, however, the front annular hood member and the rear annular hood member are connected to each other by an internal thread and an external thread. Thus a portion connecting the front annular hood member and the rear annular hood member is exposed. Therefore, this lens hood does not have a pleasing appearance. Further, in this lens hood, since the front annular hood member and the rear annular hood member are threadingly fitted to each other, the strength of the connection of the front annular hood member and the rear annular hood member is very low. Therefore, the front annular hood member and the rear annular hood member must be formed with a predetermined large thickness. Accordingly, it is difficult for this lens hood to be formed with a thin thickness.

SUMMARY OF THE INVENTION

Therefore, an object of the present invention is to provide a lens hood for a camera in which, although the lens hood is a divided type having front and rear annular hood members, the portion connecting the front and rear annular hood members is not exposed. Thus, the lens hood has a pleasing appearance and sufficient strength is provided to the connection between the front and rear annular hood members.

According to the present invention there is provided a lens barrel for a camera, including a lens frame, a lens hood, a screw, and an annular cover member, with the lens being housed in the lens frame. The lens hood is provided on an outer surface of a front end of the lens frame and is movable along the optical axis of the lens. The lens hood has a front annular hood member and a rear annular hood member connected to each other by a screw. The annular cover member covers the screw and the portion connecting the front and rear annular hood members.

Further, according the present invention there is provided a lens barrel for a camera, in which a lens hood is provided on an outer surface of a lens frame positioned at a front end of the lens barrel, and is movable along the optical axis of the lens. The lens hood is divided into a front annular hood member and a rear annular hood member, connected to each other by a screw. An outer surface of the front and rear annular hood members, to which the screw is connected, is covered with an annular cover member.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
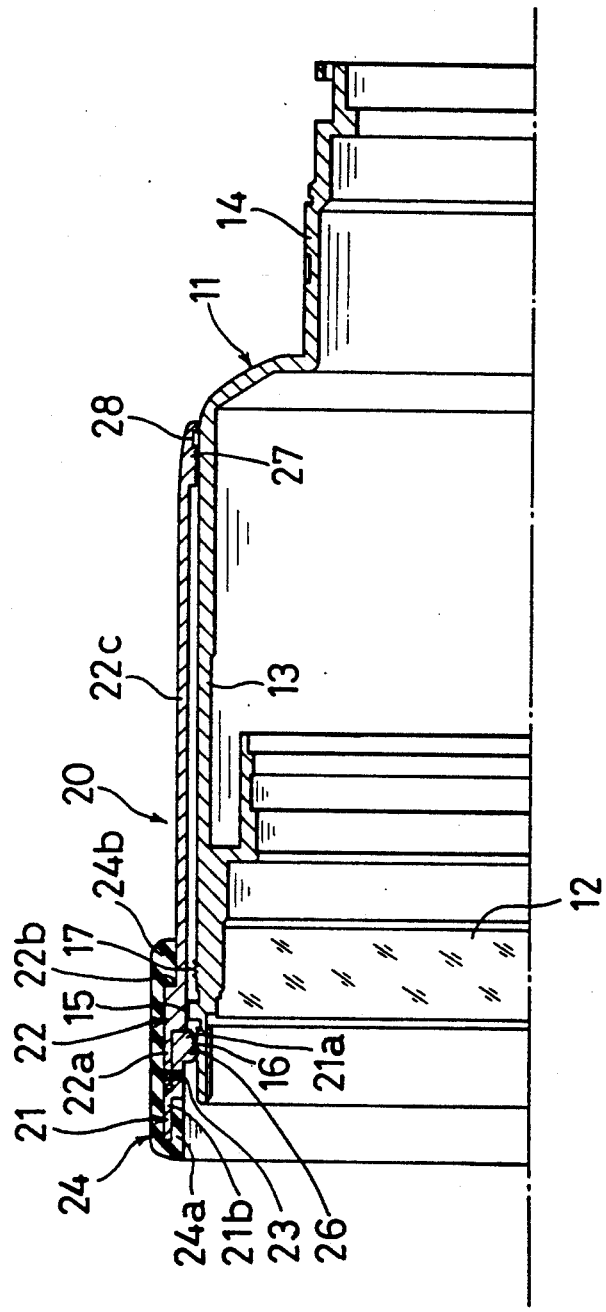
FIG. 1 is a sectional view showing a lens barrel of an embodiment of the present invention in a state in which the lens hood is not in use.

The present invention will now be described with reference to embodiments shown in the drawings.

Figure 2:
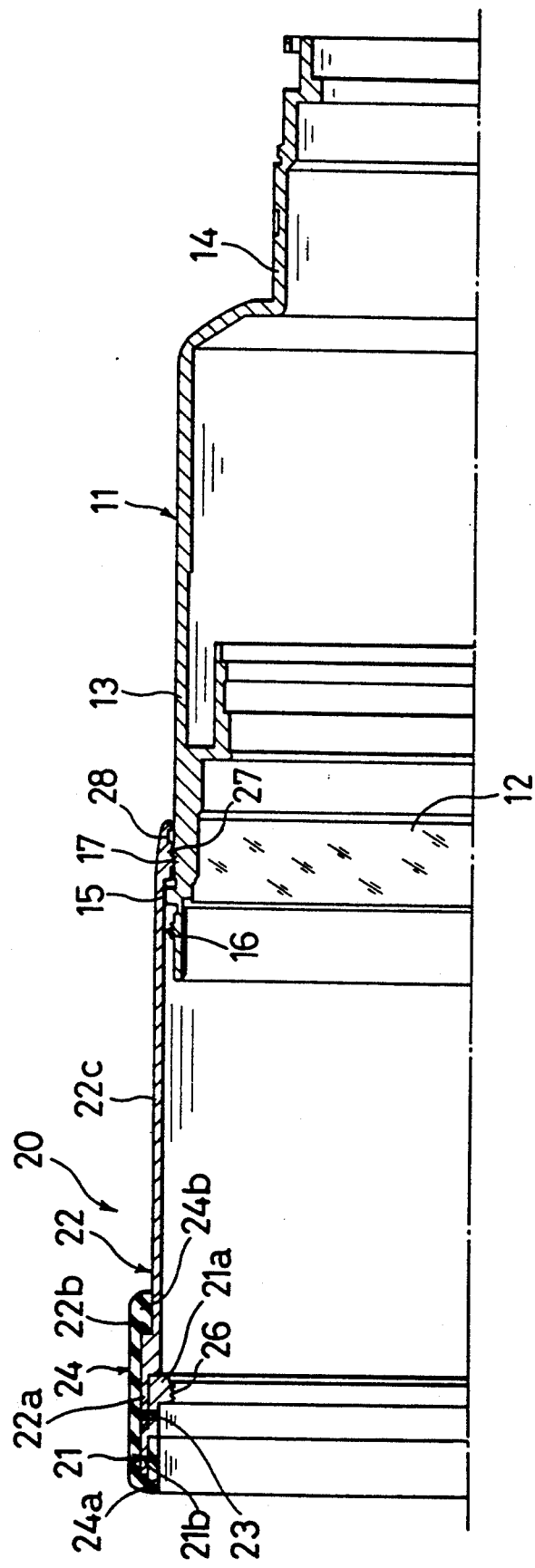
FIG. 2 is a sectional view showing the lens barrel in a state in which the lens hood is in use.

FIGS. 1 and 2 show an embodiment of the present invention, wherein FIG. 1 shows a state in which the lens hood 20 is positioned at a retracted position, i.e., a not in use position, and FIG. 2 shows a state in which the lens hood 20 is positioned at a projected position, i.e., an in use position.

A lens barrel is provided with a lens frame 11 in which a lens 12 is housed; the lens frame 11 being cylindrical and provided at the front end of the lens barrel. The lens frame 11 has a large diameter portion 13 formed at a front part thereof, and a small diameter portion 14 formed at a rear part thereof. A lens hood 20 is slidably fitted on an outer surface of the large diameter portion 13, and is movable along the optical axis of the lens 12.

The lens frame 11 has an annular projection 15 formed on an outer surface thereof, by which the lens hood 20 is slidably supported. A first external thread 16 is formed on the outer surface of the lens frame 11 and located in front of the annular projection 15. The first external thread 16 is provided for fixing the lens hood 20 at a retracted position (FIG. 1). Further, second external thread 17 is formed on the outer surface of the lens frame 11 and located behind the annular projection 15. The second external thread 17 is provided for fixing the lens hood 20 at the projected position (FIG. 2).

The lens hood 20 has a front annular hood member 21 and a rear annular hood member 22, i.e., the lens hood 20 is divided into the front annular hood member 21 and the rear annular hood member 22. A rear part 21a of the front annular hood member 21 is fitted in a front end part 22a of the rear annular hood member 22. An outer surface of the front end part 22a is smoothly continued to merge with an outer surface of a front part 21b of the front annular member 21, to thereby form a cylindrical surface. A plurality of screws 23 are provided for connecting the front annular hood member 21 and the rear annular hood member 22, and are aligned along a periphery of the hood members 21 and 22. The screws 23 are radially extended and passed through the rear part 21a of the front annular hood member 21 and the front end part 22a of the rear annular hood member 22, i.e., the heads of the screws 23 are exposed on an outer surface of the front end part 22a.

A cover member 24 is provided for covering the heads of the screws 23 and an annular boundary portion at which the front annular hood member 21 and the rear annular hood member 22 are in contact with each other. The cover member 24 has a U-shaped portion 24a tightly fitted on outer and inner surfaces of the front part 21b of the front annular member 21, to thereby cover the front part 21b. Namely, the cover member 24 covers an outer surface of the front end part 22a of the rear annular hood member 22 and the whole of the outer surface of the front annular hood member 21. The cover member 24 also has a small diameter portion 24b at the rearmost portion thereof, and this small diameter portion 24b is engaged with a step portion 22b formed on an outer surface of the rear annular hood member 22. Note, the cover member 24 is made for example, of a rubber material.

A hood part 22c of the rear annular hood member 22 is connected to the step portion 22b. The hood part 22c covers the large diameter portion 13 of the lens frame 11 in the retracted position, as shown in FIG. 1. The lens hood 20 has a first internal thread 26 and a second internal thread 27. The first internal thread 26 is formed on an inner surface of the rear part 21a of the front annular hood member 21 and can be threadingly engaged with the first external thread 16, as shown in FIG. 1. The second internal thread 27 is formed on an inner surface of the rearmost part of the hood part 22c of the rear annular hood member 22, and can be threadingly engaged with the second external thread 17, as shown in FIG. 2. The inside diameters of the first and second internal threads 26 and 27 are made smaller than an outside diameter of the annular projection 15, to thereby prevent an unwanted detaching of the lens hood 22 from the lens frame 11.

A soft material 28 is fixed on an inner surface of the rear annular hood member 22, and located behind the second internal thread 27. The soft material 28 is, for example, a woolen cloth, and is slidably fitted on an outer surface of the large diameter portion 13 of the lens frame 11.

When the lens hood 20 is not in use, the lens hood 20 is retracted to the small diameter portion 14 and is rotated about the central axis, so that the first internal thread 26 is threadingly engaged with the first external thread 16, whereby the lens hood 20 is fixed at the retracted position, as shown in FIG. 1. Conversely, when the lens hood 20 is in use, the lens hood 20 is moved forward and is rotated about the central axis thereof, so that the second internal thread 27 is threadingly engaged with the second external thread 17, whereby the lens hood 20 is fixed at the projected position, as shown in FIG. 2.

As described in the above-embodiment, the lens hood 20 is divided into front and rear annular hood members 21 and 22, and the connecting portion or joint between these hood members 21 and 22 is covered with the cover member 24. Therefore, the connecting portion and the screws 23 are not exposed. Accordingly, the external view of the lens hood 20 is smooth and pleasing. Thus, the lens barrel has a high-quality appearance. Further, since the front annular hood member 21 and the rear annular hood member 22 are connected to each other by the screws 23, even if the front annular hood member 21 and the rear annular hood member 22 are formed with a thin thickness, the required strength of the lens hood 20 is obtained.

Although the embodiments of the present invention have been described herein with reference to the accompanying drawings, obviously many modifications and changes may be made by those skilled in this art without departing from the scope of the invention.

The present disclosure relates to subject matter contained in Japanese Utility Model Application No. 3-45103 (filed on May 20, 1991) which is expressly incorporated herein by reference in its entirety.

We claim:

1. A lens barrel for a camera comprising:
    a lens frame in which a lens is housed;
    a lens hood provided on an outer surface of a front portion of said lens frame and movable along an optical axis of the lens, said lens hood having a front annular hood member and a rear annular hood member;
    a screw extending radially and connecting said front and rear annular hood members; and
    an annular cover member covering said screw, and a portion connecting said front and rear annular hood members.

2. A lens barrel according to claim 1, wherein a rear portion of said front annular hood member is fitted in a front portion of said rear annular hood member.

3. A lens barrel according to claim 1, wherein said annular cover member covers an outer surface of said front portion of said rear annular hood member and the whole of an outer surface of said front annular hood member.

4. A lens barrel according to claim 3, wherein said annular cover member covers an inner surface of a front end portion of said front annular hood member.

5. A lens barrel according to claim 1, wherein said lens frame is provided with an annular projection formed on an outer surface of said lens frame, a first external thread formed on said outer surface and located in front of said annular projection, and a second external thread formed on said outer surface and located behind said annular projection.

6. A lens barrel according to claim 5, wherein said lens hood has a first internal thread formed on an inner surface of said lens hood and threadingly fitted to said first external thread, and a second internal thread formed on said inner surface and threadingly fitted to said second external thread.

7. A lens barrel according to claim 6, wherein said first internal thread is provided at a front end portion of said lens hood, and said second internal thread is provided at a rear end portion of said lens hood.

8. A lens barrel for a camera, in which a lens hood is provided on an outer surface of a lens frame, positioned at the front end of the lens barrel, and is movable along the optical axis of the lens, characterized in that said lens hood is divided into a front annular hood member and a rear annular hood member connected to each other by a screw, and an outer surface of said front and rear annular hood members, to which said screw is connected, is covered with an annular cover member.

* * * * *